United States Patent
Pfeffer et al.

(10) Patent No.: US 11,892,750 B2
(45) Date of Patent: Feb. 6, 2024

(54) MULTIPLE LED ARRAYS WITH NON-OVERLAPPING SEGMENTATION

(71) Applicant: Lumileds LLC, San Jose, CA (US)

(72) Inventors: Nicola Bettina Pfeffer, Eindhoven (NL); Arjen Gerben Van der Sijde, Eindhoven (NL); Charles André Schrama, San Jose, CA (US)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 17/986,591

(22) Filed: Nov. 14, 2022

(65) Prior Publication Data

US 2023/0152670 A1 May 18, 2023

Related U.S. Application Data

(60) Provisional application No. 63/279,233, filed on Nov. 15, 2021.

(51) Int. Cl.
*G03B 15/05* (2021.01)

(52) U.S. Cl.
CPC .................................. *G03B 15/05* (2013.01)

(58) Field of Classification Search
CPC ........ G03B 15/05; G03B 15/07; G03B 15/03; G03B 15/02; G03B 15/00; F21V 5/00; F21V 14/00; F21V 14/02; F21V 14/025; F21V 14/06; F21V 14/065; F21V 33/00; F21V 33/0052; F21Y 2115/10

See application file for complete search history.

(56) References Cited

U.S. PATENT DOCUMENTS

| | | | | |
|---|---|---|---|---|
| 10,924,686 | B2* | 2/2021 | Antretter | G03B 7/16 |
| 2015/0338722 | A1* | 11/2015 | Bonnier | G03B 15/07 |
| | | | | 362/4 |
| 2018/0324343 | A1 | 11/2018 | Van Der et al. | |
| 2019/0324350 | A1 | 10/2019 | Van Der et al. | |
| 2020/0132277 | A1 | 4/2020 | Akkaya et al. | |
| 2021/0211639 | A1 | 7/2021 | Wang et al. | |
| 2021/0225816 | A1 | 7/2021 | Engelen et al. | |

FOREIGN PATENT DOCUMENTS

WO 2023086633 5/2023

OTHER PUBLICATIONS

"International Application Serial No. PCT/US2022/049828, International Search Report dated Mar. 15, 2023", 4 pgs.
"International Application Serial No. PCT/US2022/049828, Written Opinion dated Mar. 15, 2023", 3 pgs.

* cited by examiner

*Primary Examiner* — Bao Q Truong
(74) *Attorney, Agent, or Firm* — Schwegman, Lundberg & Woessner, P.A.

(57) ABSTRACT

First and second LED arrays can include respective first and second pluralities of light-emitting areas that are separated by respective first and second boundaries. The first and second boundaries can be arranged in slightly different patterns. At least one lens can collimate light from the first LED array to form first illumination, collimate light from the second LED array to form second illumination, and illuminate the scene with the first and second illuminations. The first boundaries can form first dark bands in the first illumination. The second boundaries can form second dark bands in the second illumination, which can be slightly offset from the first dark bands at the scene.

20 Claims, 6 Drawing Sheets

MULTIPLE LED ARRAYS WITH NON-OVERLAPPING SEGMENTATION

CROSS-REFERENCE TO RELATED APPLICATION

This application claims the benefit of U.S. Provisional Application No. 63/279,233, filed on Nov. 15, 2021, the entirety of which is hereby incorporated by reference herein.

FIELD OF THE DISCLOSURE

The present disclosure relates to an illumination system, such as for a camera.

BACKGROUND OF THE DISCLOSURE

An illumination system can provide illumination for a scene. There is ongoing effort to improve illumination systems, such as for cameras.

BRIEF DESCRIPTION OF THE DRAWINGS

Corresponding reference characters indicate corresponding parts throughout the several views. Elements in the drawings are not necessarily drawn to scale. The configurations shown in the drawings are merely examples and should not be construed as limiting in any manner.

DETAILED DESCRIPTION

In an example, first and second LED arrays can include respective first and second pluralities of light-emitting areas that are separated by respective first and second boundaries. The first and second boundaries can be arranged in slightly different patterns. At least one lens can collimate light from the first LED array to form first illumination, collimate light from the second LED array to form second illumination, and illuminate the scene with the first and second illuminations. The first boundaries can form first dark bands in the first illumination. The second boundaries can form second dark bands in the second illumination, which can be slightly offset from the first dark bands at the scene. The offset can help reduce or eliminate dark bands in the total illumination at the scene, which could be present if only one LED array and lens were used.

Figure 1:
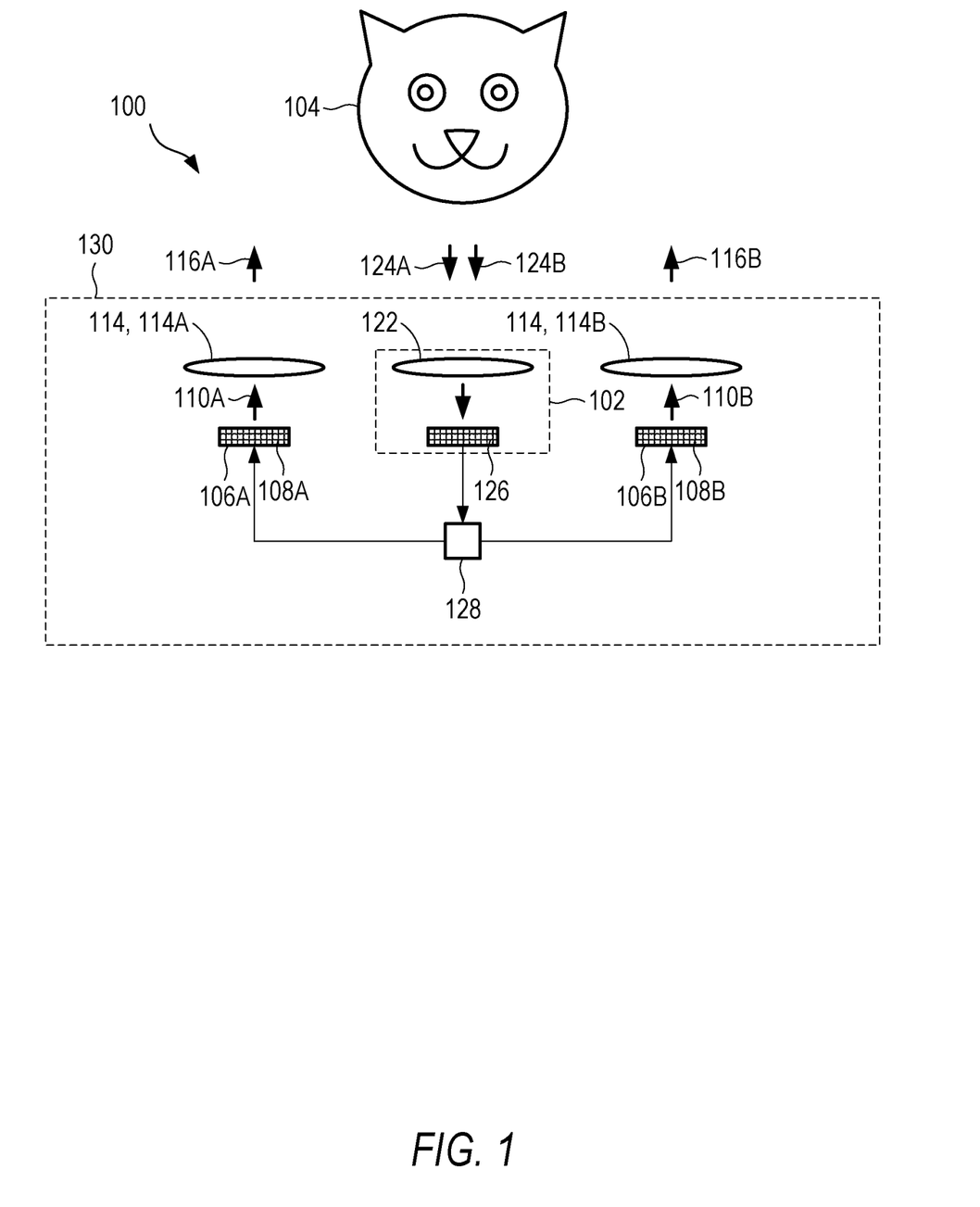
FIG. 1 shows a side view of an example of an illumination system, such as for a camera, in accordance with some examples.

FIG. 1 shows a side view of an example of an illumination system 100, such as for a camera 102, in accordance with some examples. The camera 102 can capture an image of a scene 104 during an exposure duration of the camera 102. In FIG. 1, the scene 104 is shown as being a happy cat; other suitable scenes can also be used.

The illumination system 100 can include a first light-emitting diode (LED) array 106A. The first LED array 106A can include a plurality of first light-emitting areas 108A that can emit first light 110A. The first light-emitting areas 108A can be separated by first boundaries (e.g., areas on the first LED array 106A that do not emit light).

The illumination system 100 can include a second LED array 106B. The second LED array 106B can include a plurality of second light-emitting areas 108B that can emit second light 110B. The second light-emitting areas 108B can be separated by second boundaries that correspond in a one-to-one correspondence to the first boundaries.

In some examples, the first LED array 106A and/or the second LED array 106B can optionally be covered by a wavelength converting layer, such as a phosphor. The first LED array 106A and/or the second LED array 106B can produce first light having a first wavelength, such as in the blue or violet portion of the visible spectrum. The wavelength converting layer can absorb some or all of the first light and emit second light having a second wavelength that is greater than the first wavelength, such as in the yellow portion of the visible spectrum. The full light output can be the second light, or a combination of the first light and the second light. In some examples, the phosphor and the geometry of the first LED array 106A and/or the second LED array 106B can be tailored to output light having a specified peak wavelength and/or a specified wavelength spectrum.

The illumination system 100 can include at least one lens 114 that can collimate the first light 110A to form first illumination 116A and illuminate the scene 104 with the first illumination 116A. The at least one lens 114 can collimate the second light 110B to form second illumination 116B and illuminate the scene 104 with the second illumination 116B.

In the configuration of FIG. 1, the at least one lens 114 can include a first lens 114A, which can collimate the first light 110A to form the first illumination 116A, and a second lens 114B, which can collimate the second light 110B to form second illumination 116B.

In some examples, a first central axis can extend from the first LED array 106A through a center of the first lens 114A to the scene 104. In some examples, a second central axis can extend from the second LED array 106B through a center of the second lens 114B to the scene 104. In some examples, the first central axis can be substantially parallel to the second central axis.

Figure 5:
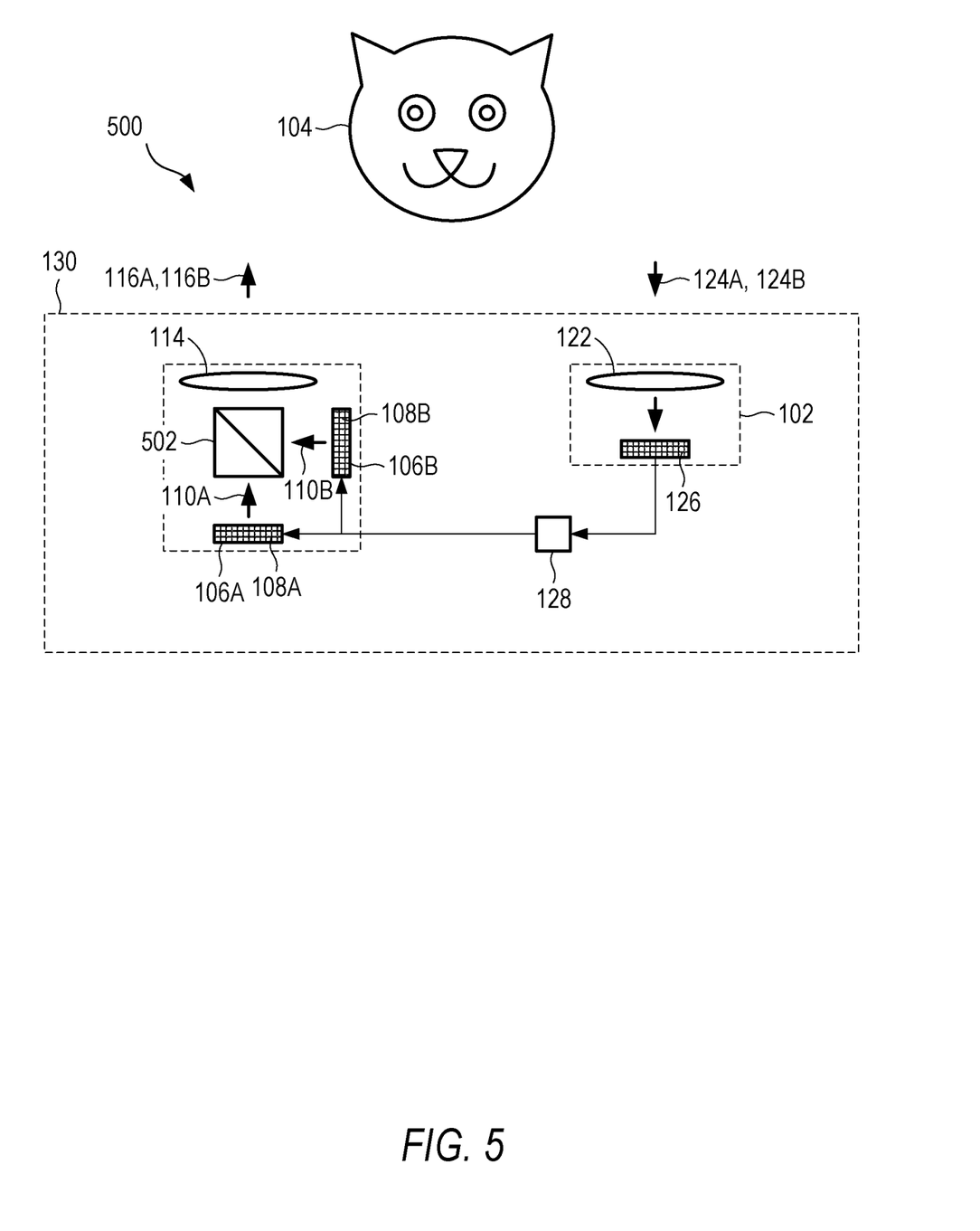
FIG. 5 shows a side view of an example of an illumination system, such as for a camera, in accordance with some examples.

In other configurations, such as shown in FIG. 5 and described below, the at least one lens 114 can include only a single lens, with an additional beamsplitter combining the first light 110A and the second light 110B so that the single lens can collimate both the first light 110A and the second light 110B.

In some examples, the illumination system 100 can optionally further include a controller 128. The controller 128 can receive a specified illumination pattern. The controller 128 can electrically power the first LED array 106A in response to the specified illumination pattern such that the first illumination 116A corresponds to the specified illumination pattern. The controller 128 can electrically power the second LED array 106B in response to the specified illumination pattern such that the second illumination 116B corresponds to the specified illumination pattern.

In some examples, the illumination system 100 can optionally further include a housing 130. The first LED array 106A and the second LED array 106B can be disposed in the housing 130. The first lens 114A and the second lens 114B can be disposed in or on the housing 130. The first lens 114A and the second lens 114B can direct the first illumination 116A and the second illumination 116B, respectively, away from the housing 130.

In some examples, the illumination system 100 can optionally further include a camera 102 disposed in or on the housing 130. The camera 102 can collect first illumination 124A that is reflected from the scene 104 and second illumination 124B that is reflected from the scene 104. The camera 102 can include a lens 122 to form an image of the scene 104 from the collected light. A multi-pixel sensor 126 in the camera 102 can sense the image.

In some examples, the camera 102 can be located between the first lens 114A and the second lens 114B.

Because the first lens 114A can collimate the first light 110A, such as by locating the first LED array 106A at a focal plane of the first lens 114A, features in translational space on the first LED array 106A can correspond to features in angular space in the first illumination 116A. For example, bright and dark areas of the first LED array 106A can correspond to bright and dark regions in angular space emerging from the illumination system 100. Because the scene 104 can be relatively far from the illumination system 100, compared with distance and sizes of the elements in the illumination system 100, the bright and dark regions in angular space can correspond to bright and dark areas in the illumination pattern that the illumination system projects onto the scene 104.

Similarly, because the second lens 114B can collimate the second light 110B, such as by locating the second LED array 106B at a focal plane of the second lens 114B, features in translational space on the second LED array 106B can correspond to features in angular space in the second illumination 116B. Because the scene 104 can be relatively far from the illumination system 100, compared with distance and sizes of the elements in the illumination system 100, the bright and dark regions in angular space can correspond to bright and dark areas in the illumination pattern that the illumination system projects onto the scene 104.

Further, because a distance to the scene 104 can be significantly greater than a spacing between the first lens 114A and the second lens 114B, the spacing between the first lens 114A and the second lens 114B can be neglected when determining where a particular ray at a particular propagation angle will strike the scene 104. As a result, it can be assumed that a first ray propagating at a specified propagation angle in the first illumination 116A and a second ray propagating at the specified propagation angle in the second illumination 116B can arrive at the same location in the scene 104. FIGS. 2-5 below show examples of illumination patterns at the scene 104.

Figure 2:
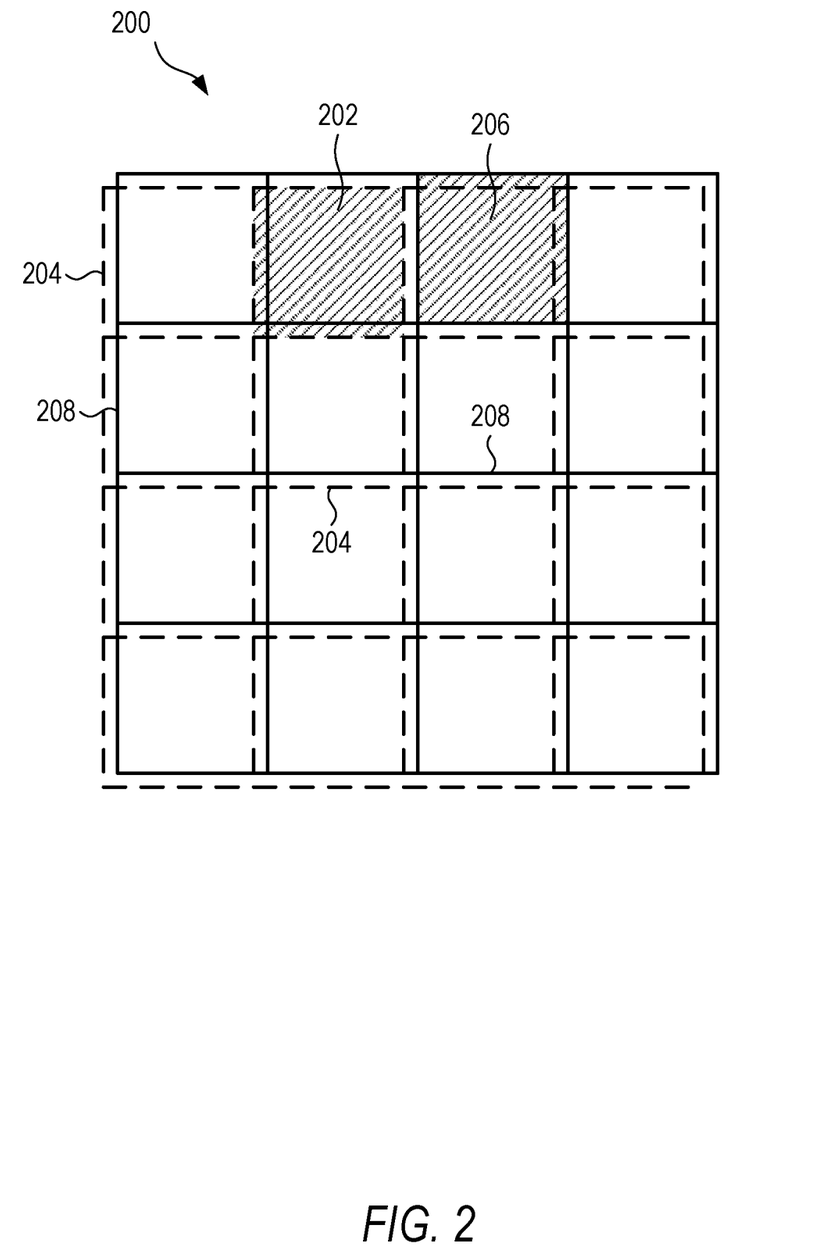
FIG. 2 shows a front view of an example of an illumination pattern at the scene, in accordance with some examples.
Figure 3:
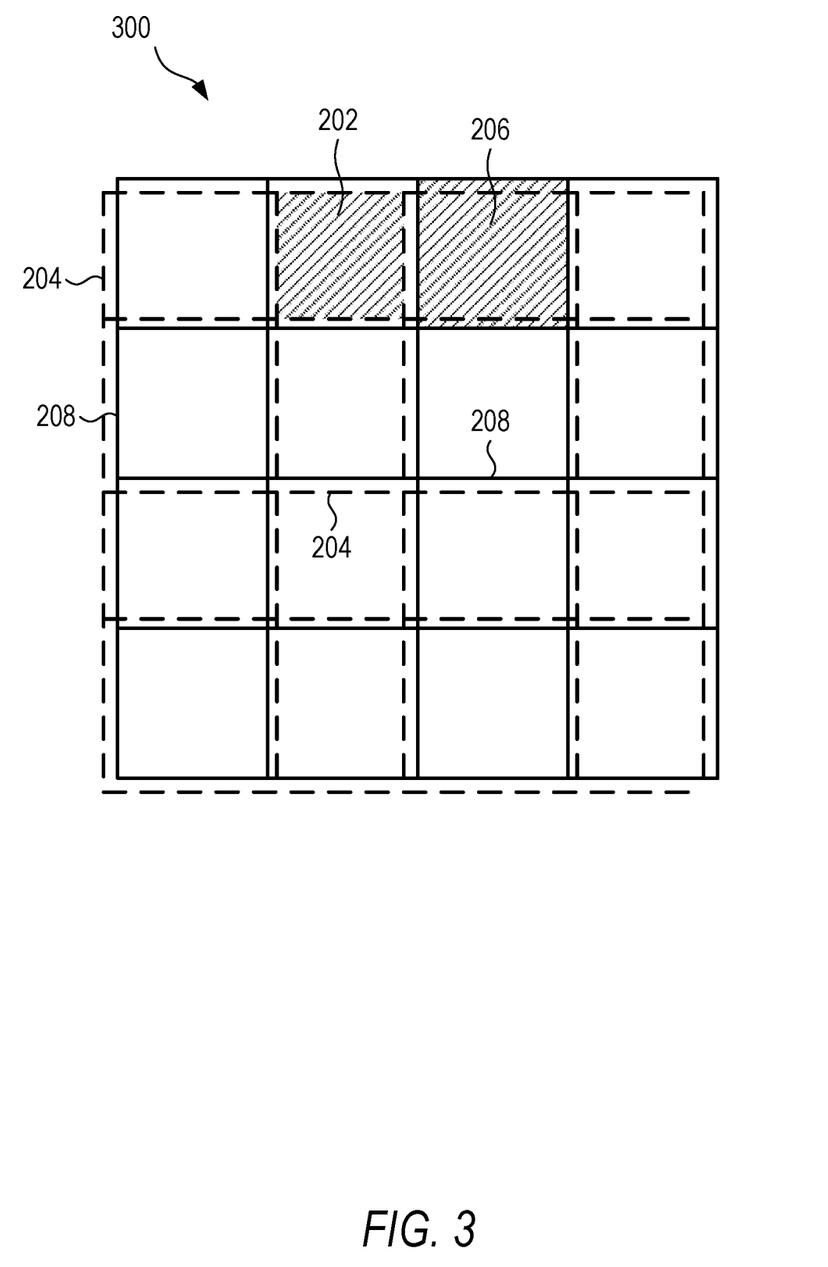
FIG. 3 shows a front view of another example of an illumination pattern at the scene, in accordance with some examples.
Figure 4:
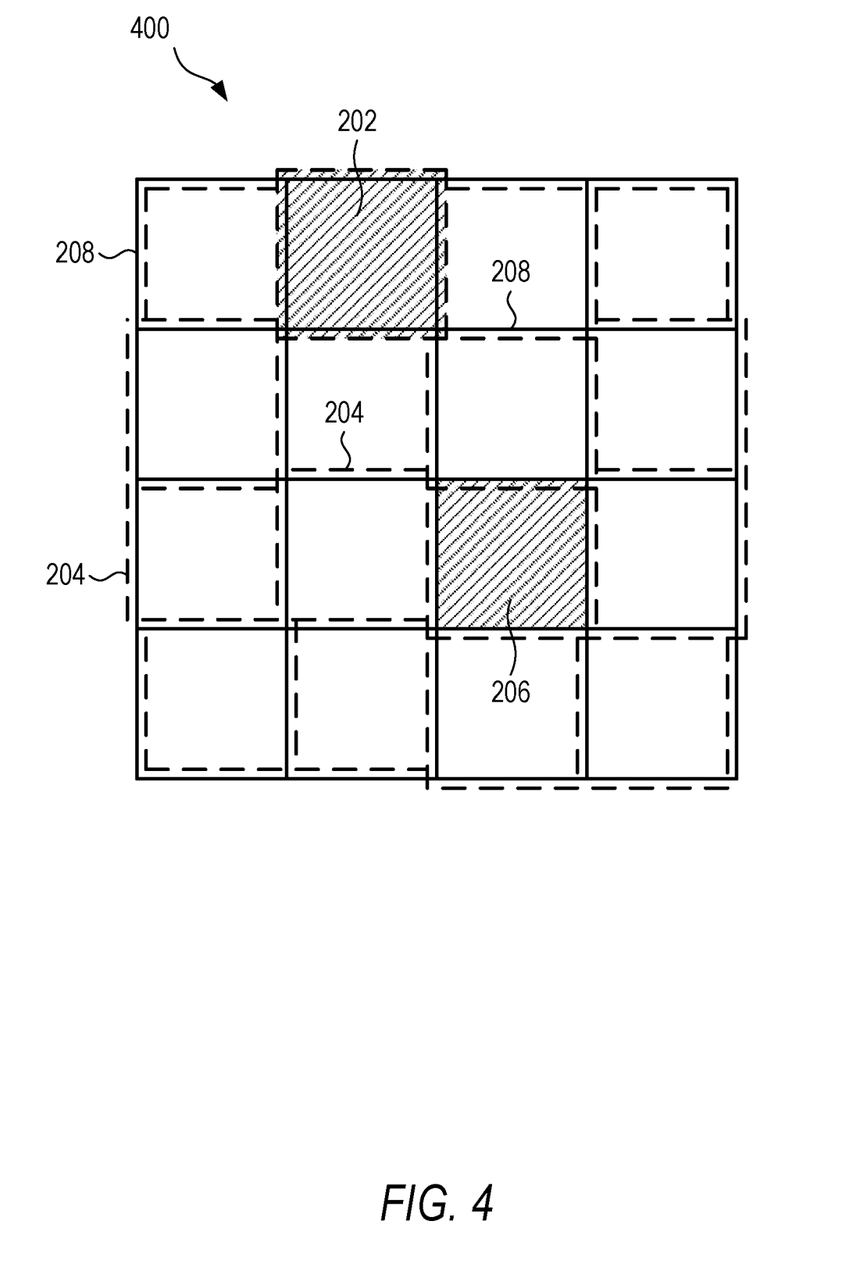
FIG. 4 shows a front view of another example of an illumination pattern at the scene, in accordance with some examples.

FIG. 2 shows a front view of an example of an illumination pattern 200 at the scene 104, in accordance with some examples. FIG. 3 shows a front view of another example of an illumination pattern 300 at the scene 104, in accordance with some examples. FIG. 4 shows a front view of another example of an illumination pattern 400 at the scene 104, in accordance with some examples.

The first light-emitting areas 108A can form corresponding first illumination regions 202 in the first illumination 116A at the scene 104. The first boundaries can form first dark bands 204 in the first illumination 116A at the scene 104. The second light-emitting areas 108B can form corresponding second illumination regions 206 in the second illumination 116B at the scene 104. Each second illumination region 206 can at least partially overlap with a corresponding first illumination region 202 at the scene 104. The second boundaries can form second dark bands 208 in the second illumination 116B at the scene 104.

The second dark bands 208 can be offset from the corresponding first dark bands 204 at the scene. The offset can help reduce or eliminate dark bands in the combined first illumination 116A and second illumination 116B, which could be present if the second dark bands 208 were not offset from the first dark bands 204, and, in turn, the second boundaries (e.g., non-emitting areas of the second LED array 106B) were not offset from the first boundaries (e.g., non-emitting areas of the first LED array 106A). Suitable offsets can include values of greater than 50% of a width of the dark band, greater than 100% of the width of the dark band, greater than 150% of the width of the dark band, 200% of the width of the dark band, or others. In some examples, the controller 128 can be trained to use a suitable offset, and/or can use a programmable offset.

In some examples, the plurality of second light-emitting areas 108B can correspond in a one-to-one correspondence to the plurality of first light-emitting areas 108A. For example, the pluralities of first light-emitting areas 108A and second light-emitting areas 108B can be electrically powered or controlled together, to produce illumination together. The one-to-one correspondence can help ensure that the illumination is produced with the same resolution (e.g., number of light-producing elements or pixels) as the first LED array 106A and/or the second LED array 106B. In other examples, the correspondence may not be one-to-one, such as a single light-producing element of one LED array corresponding to multiple light-producing elements of the other LED array. Other configurations are also possible.

In some examples, the first dark bands 204 in the first illumination 116A at the scene 104 can be substantially parallel to the second dark bands 208 in the second illumination 116B at the scene 104. For example, the first dark bands 204 can correspond to boundaries that extend along a first direction and boundaries that extend along a second direction that is orthogonal to the first direction. The second dark bands 208 can also correspond to boundaries that extend along the first direction and boundaries that extend along the second direction.

In some examples, the plurality of first light-emitting areas 108A can be arranged in a first rectilinear array along orthogonal first and second dimensions. In some examples, each first boundary can be arranged as an elongated area that extends along one of the first or second dimensions. In some examples, the plurality of second light-emitting areas 108B can be arranged in a second rectilinear array along the first and second dimensions. In some examples, each second boundary can be arranged as an elongated area that extends along one of the first or second dimensions.

In some examples, such as the configurations of FIGS. 2 and 3, at least one first boundary (corresponding to first dark bands 204) can extend in an unbroken line along a full extent of the first rectilinear array.

In some examples, such as the configurations of FIGS. 2-4, at least one first boundary (corresponding to first dark bands 204) can include a discontinuity. For example, at least one first boundary can include a first segment and a second segment laterally offset from the first segment.

In some examples, such as the configuration of FIG. 4, at least one first boundary (corresponding to first dark bands 204) can include a plurality of segments that are parallel.

In some examples, such as the configurations of FIGS. 2-4, at least one second boundary (corresponding to second dark bands 208) can extend in an unbroken line along a full extent of the second rectilinear array.

In some examples, such as the configuration of FIG. 4, at least one second boundary (corresponding to second dark bands 208) can include a discontinuity.

In some examples, such as the configuration of FIG. 4, at least one second boundary (corresponding to second dark bands 208) can include a plurality of segments that are parallel.

FIG. 5 shows a side view of an example of an illumination system 500, such as for a camera 102, in accordance with some examples.

Compared with the illumination system 100 of FIG. 1, the illumination system 500 uses a single lens 114 to replace the first lens 114A and the second lens 114B, and includes an additional beamsplitter 502 to combine the first light 110A with the second light 110B and direct the combined first light 110A and second light 110B to the lens 114. The beamsplitter 502 can be formed as a cube beamsplitter having a beamsplitting coating disposed on a hypotenuse of the cube. The beamsplitter 502 can alternatively be formed as a plate beamsplitter, a polygonal prism, or other suitable beamsplitting geometry.

Figure 6:
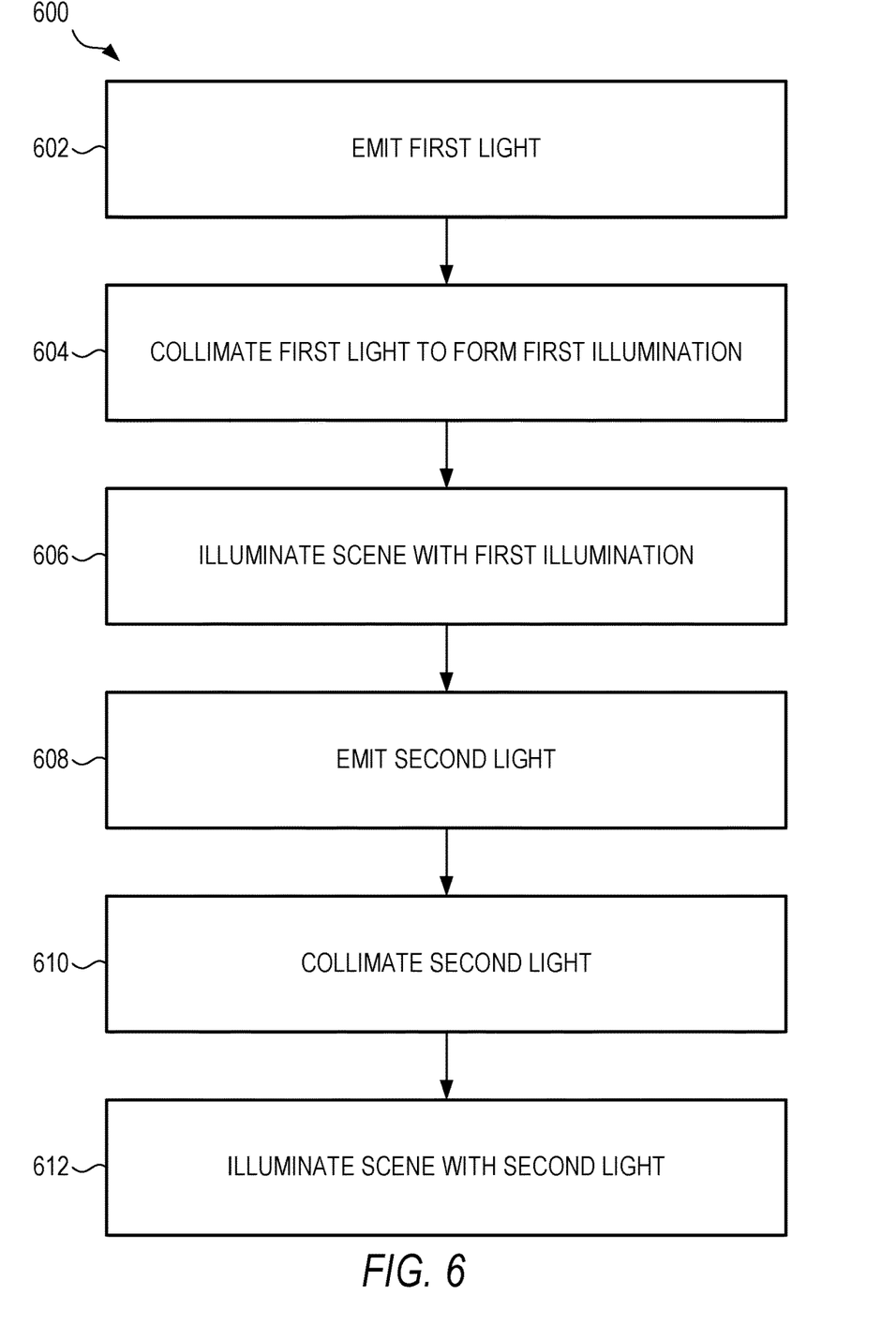
FIG. 6 shows a flowchart of an example of a method for providing illumination, in accordance with some examples.

FIG. 6 shows a flowchart of an example of a method 600 for providing illumination, in accordance with some examples. The method 600 can be executed by illumination system 100, illumination system 500, or another suitable system. The method 600 for providing illumination is but one method for providing illumination; other suitable methods can also be used.

At operation 602, first light can be emitted from a plurality of first light-emitting areas of a first LED array. The first light-emitting areas can be separated by first boundaries.

At operation 604, the first light can be collimated to form first illumination.

At operation 606, a scene can be illuminated with the first illumination. The first light-emitting areas can form corresponding first illumination regions in the first illumination at the scene. The first boundaries can form first dark bands in the first illumination at the scene.

At operation 608, second light can be emitted from a plurality of second light-emitting areas of a second LED array. The second light-emitting areas can be separated by second boundaries that correspond in a one-to-one correspondence to the first boundaries.

At operation 610, the second light can be collimated to form second illumination.

At operation 612, the scene can be illuminated with the second illumination. The second light-emitting areas can form corresponding second illumination regions in the second illumination at the scene. Each second illumination region can at least partially overlap with a corresponding first illumination region at the scene. The second boundaries can form second dark bands in the second illumination at the scene. The second dark bands can be offset from the corresponding first dark bands at the scene.

The method 600 can optionally further include receiving, with a controller, a specified illumination pattern.

The method 600 can optionally further include electrically powering the first LED array in response to the specified illumination pattern such that the first illumination corresponds to the specified illumination pattern.

The method 600 can optionally further include electrically powering the second LED array in response to the specified illumination pattern such that the second illumination corresponds to the specified illumination pattern.

The system and method are applicable to adaptive flash for mobile devices, steerable illumination for automotive/industry applications, and others.

To further illustrate the systems and related methods disclosed herein, a non-limiting list of examples is provided below. Each of the following non-limiting examples can stand on its own or can be combined in any permutation or combination with any one or more of the other examples.

In Example 1, an illumination system can include: a first light-emitting diode (LED) array including a plurality of first light-emitting areas that are configured to emit first light, the first light-emitting areas being separated by first boundaries; at least one lens configured to collimate the first light to form first illumination and illuminate a scene with the first illumination, the first light-emitting areas forming corresponding first illumination regions in the first illumination at the scene, the first boundaries forming first dark bands in the first illumination at the scene; and a second LED array including a plurality of second light-emitting areas that are configured to emit second light, the second light-emitting areas being separated by second boundaries that correspond in a one-to-one correspondence to the first boundaries. The at least one lens is configured to collimate the second light to form second illumination and illuminate the scene with the second illumination. The second light-emitting areas form corresponding second illumination regions in the second illumination at the scene. Each second illumination region at least partially overlaps with a corresponding first illumination region at the scene. The second boundaries form second dark bands in the second illumination at the scene. The second dark bands are offset from the corresponding first dark bands at the scene.

In Example 2, the illumination system of Example 1 can optionally be configured such that the plurality of second light-emitting areas corresponds in a one-to-one correspondence to the plurality of first light-emitting areas.

In Example 3, the illumination system of any one of Examples 1-2 can optionally be configured such that the first dark bands in the first illumination at the scene are substantially parallel to the second dark bands in the second illumination at the scene.

In Example 4, the illumination system of any one of Examples 1-3 can optionally be configured such that: the plurality of first light-emitting areas is arranged in a first rectilinear array along orthogonal first and second dimensions; each first boundary is arranged as an elongated area that extends along one of the first or second dimensions; the plurality of second light-emitting areas is arranged in a second rectilinear array along the first and second dimensions; and each second boundary is arranged as an elongated area that extends along one of the first or second dimensions.

In Example 5, the illumination system of any one of Examples 1-4 can optionally be configured such that at least one first boundary extends in an unbroken line along a full extent of the first rectilinear array.

In Example 6, the illumination system of any one of Examples 1-5 can optionally be configured such that at least one first boundary includes a discontinuity.

In Example 7, the illumination system of any one of Examples 1-6 can optionally be configured such that the at least one first boundary includes a plurality of segments that are parallel.

In Example 8, the illumination system of any one of Examples 1-7 can optionally be configured such that at least one second boundary extends in an unbroken line along a full extent of the second rectilinear array.

In Example 9, the illumination system of any one of Examples 1-8 can optionally be configured such that at least one second boundary includes a discontinuity.

In Example 10, the illumination system of any one of Examples 1-9 can optionally be configured such that the at least one second boundary includes a plurality of segments that are parallel.

In Example 11, the illumination system of any one of Examples 1-10 can optionally be configured such that the at least one lens comprises a first lens configured to collimate the first light to form the first illumination and a second lens configured to collimate the second light to form the second illumination.

In Example 12, the illumination system of any one of Examples 1-11 can optionally be configured such that: a first central axis extends from the first LED array through a center of the first lens to the scene; a second central axis extends from the second LED array through a center of the second lens to the scene; and the first central axis is substantially parallel to the second central axis.

In Example 13, the illumination system of any one of Examples 1-12 can optionally be configured such that the at least one lens comprises a first lens configured to collimate the first light to form the first illumination and collimate the second light to form the second illumination.

In Example 14, the illumination system of any one of Examples 1-13 can optionally further include a beamsplitter configured to combine the first light with the second light and direct the combined first light and second light to the first lens.

In Example 15, the illumination system of any one of Examples 1-14 can optionally further include a controller configured to: receive a specified illumination pattern; electrically power the first LED array in response to the specified illumination pattern such that the first illumination corresponds to the specified illumination pattern; and electrically power the second LED array in response to the specified illumination pattern such that the second illumination corresponds to the specified illumination pattern.

In Example 16, the illumination system of any one of Examples 1-15 can optionally further include: a housing, the first LED array and the second LED array being disposed in the housing, the first lens and the second lens being disposed in or on the housing and configured to direct the first illumination and the second illumination, respectively, away from the housing; and a camera disposed in or on the housing and configured to collect first illumination that is reflected from the scene and second illumination that is reflected from the scene to form an image of the scene.

In Example 17, the illumination system of any one of Examples 1-16 can optionally be configured such that the camera is located between the first lens and the second lens.

In Example 18, a method for providing illumination can include: emitting first light from a plurality of first light-emitting areas of a first light-emitting diode (LED) array, the first light-emitting areas being separated by first boundaries; collimating the first light to form first illumination; illuminating a scene with the first illumination, the first light-emitting areas forming corresponding first illumination regions in the first illumination at the scene, the first boundaries forming first dark bands in the first illumination at the scene; emitting second light from a plurality of second light-emitting areas of a second LED array, the second light-emitting areas being separated by second boundaries that correspond in a one-to-one correspondence to the first boundaries; collimating the second light to form second illumination; and illuminating the scene with the second illumination, the second light-emitting areas forming corresponding second illumination regions in the second illumination at the scene, each second illumination region at least partially overlapping with a corresponding first illumination region at the scene, the second boundaries forming second dark bands in the second illumination at the scene, the second dark bands being offset from the corresponding first dark bands at the scene.

In Example 19, the method of Example can optionally further include: receiving, with a controller, a specified illumination pattern; electrically powering the first LED array in response to the specified illumination pattern such that the first illumination corresponds to the specified illumination pattern; and electrically powering the second LED array in response to the specified illumination pattern such that the second illumination corresponds to the specified illumination pattern.

In Example 20, an illumination system can include: a first light-emitting diode (LED) array including a plurality of first light-emitting areas that are configured to emit first light, the first light-emitting areas being separated by first boundaries; a first lens configured to collimate the first light to form first illumination and illuminate a scene with the first illumination, the first light-emitting areas forming corresponding first illumination regions in the first illumination at the scene, the first boundaries forming first dark bands in the first illumination at the scene, a first central axis extending from the first LED array through a center of the first lens to the scene; a second LED array including a plurality of second light-emitting areas that are configured to emit second light, the plurality of second light-emitting areas corresponding in a one-to-one correspondence to the plurality of first light-emitting areas, the second light-emitting areas being separated by second boundaries that correspond in a one-to-one correspondence to the first boundaries; and a second lens configured to collimate the second light to form second illumination and illuminate the scene with the second illumination, a second central axis extending from the second LED array through a center of the second lens to the scene, the second central axis being substantially parallel to the first central axis, the second light-emitting areas forming corresponding second illumination regions in the second illumination at the scene, each second illumination region at least partially overlapping with a corresponding first illumination region at the scene, the second boundaries forming second dark bands in the second illumination at the scene, the second dark bands being substantially parallel to the first dark bands at the scene and offset from the corresponding first dark bands at the scene.

In Example 21, an illumination system can include a processor; memory including instructions that, when executed by the processor, cause the processor to perform operations, the operations including: emitting first light from a plurality of first light-emitting areas of a first light-emitting diode (LED) array, the first light-emitting areas being separated by first boundaries; collimating the first light to form first illumination; illuminating a scene with the first illumination, the first light-emitting areas forming corresponding first illumination regions in the first illumination at the scene, the first boundaries forming first dark bands in the first illumination at the scene; emitting second light from a plurality of second light-emitting areas of a second LED array, the second light-emitting areas being separated by second boundaries that correspond in a one-to-one correspondence to the first boundaries; collimating the second light to form second illumination; and illuminating the scene with the second illumination, the second light-emitting areas forming corresponding second illumination regions in the second illumination at the scene, each second illumination region at least partially overlapping with a corresponding first illumination region at the scene, the second boundaries forming second dark bands in the second illumination at the scene, the second dark bands being offset from the corresponding first dark bands at the scene.

In Example 22, the illumination system of Example 21 can optionally include the limitations of any one of Examples 1-20.

While only certain features of the system and method have been illustrated and described herein, many modifications and changes will occur to those skilled in the art. It is, therefore, to be understood that the appended claims are intended to cover all such modifications and changes. Method operations can be performed substantially simultaneously or in a different order.

What is claimed is:

1. An illumination system, the system comprising:
    a first light-emitting diode (LED) array including a plurality of first light-emitting areas that are configured to emit first light, the first light-emitting areas being separated by first boundaries;
    at least one lens configured to collimate the first light to form first illumination and illuminate a scene with the first illumination, the first light-emitting areas forming corresponding first illumination regions in the first illumination at the scene, the first boundaries forming first dark bands in the first illumination at the scene; and
    a second LED array including a plurality of second light-emitting areas that are configured to emit second light, the second light-emitting areas being separated by second boundaries that correspond in a one-to-one correspondence to the first boundaries,
    the at least one lens configured to collimate the second light to form second illumination and illuminate the scene with the second illumination, the second light-emitting areas forming corresponding second illumination regions in the second illumination at the scene, each second illumination region at least partially overlapping with a corresponding first illumination region at the scene, the second boundaries forming second dark bands in the second illumination at the scene, the second dark bands being offset from the corresponding first dark bands at the scene.

2. The illumination system of claim 1, wherein the plurality of second light-emitting areas corresponds in a one-to-one correspondence to the plurality of first light-emitting areas.

3. The illumination system of claim 1, wherein the first dark bands in the first illumination at the scene are substantially parallel to the second dark bands in the second illumination at the scene.

4. The illumination system of claim 1, wherein:
    the plurality of first light-emitting areas is arranged in a first rectilinear array along orthogonal first and second dimensions;
    each first boundary is arranged as an elongated area that extends along one of the first or second dimensions;
    the plurality of second light-emitting areas is arranged in a second rectilinear array along the first and second dimensions; and
    each second boundary is arranged as an elongated area that extends along one of the first or second dimensions.

5. The illumination system of claim 4, wherein at least one first boundary extends in an unbroken line along a full extent of the first rectilinear array.

6. The illumination system of claim 4, wherein at least one first boundary includes a discontinuity.

7. The illumination system of claim 6, wherein the at least one first boundary includes a plurality of segments that are parallel.

8. The illumination system of claim 4, wherein at least one second boundary extends in an unbroken line along a full extent of the second rectilinear array.

9. The illumination system of claim 4, wherein at least one second boundary includes a discontinuity.

10. The illumination system of claim 9, wherein the at least one second boundary includes a plurality of segments that are parallel.

11. The illumination system of claim 1, wherein the at least one lens comprises a first lens configured to collimate the first light to form the first illumination and a second lens configured to collimate the second light to form the second illumination.

12. The illumination system of claim 11, wherein:
    a first central axis extends from the first LED array through a center of the first lens to the scene;
    a second central axis extends from the second LED array through a center of the second lens to the scene; and
    the first central axis is substantially parallel to the second central axis.

13. The illumination system of claim 1, wherein the at least one lens comprises a first lens configured to collimate the first light to form the first illumination and collimate the second light to form the second illumination.

14. The illumination system of claim 13, further comprising a beamsplitter configured to combine the first light with the second light and direct the combined first light and second light to the first lens.

15. The illumination system of claim 1, further comprising a controller configured to:
    receive a specified illumination pattern;
    electrically power the first LED array in response to the specified illumination pattern such that the first illumination corresponds to the specified illumination pattern; and
    electrically power the second LED array in response to the specified illumination pattern such that the second illumination corresponds to the specified illumination pattern.

16. The illumination system of claim 1, further comprising:
    a housing, the first LED array and the second LED array being disposed in the housing, the first lens and the second lens being disposed in or on the housing and configured to direct the first illumination and the second illumination, respectively, away from the housing; and
    a camera disposed in or on the housing and configured to collect first illumination that is reflected from the scene and second illumination that is reflected from the scene to form an image of the scene.

17. The illumination system of claim 16, wherein the camera is located between the first lens and the second lens.

18. A method for providing illumination, the method comprising:
    emitting first light from a plurality of first light-emitting areas of a first light-emitting diode (LED) array, the first light-emitting areas being separated by first boundaries;

collimating the first light to form first illumination;
illuminating a scene with the first illumination, the first light-emitting areas forming corresponding first illumination regions in the first illumination at the scene, the first boundaries forming first dark bands in the first illumination at the scene;
emitting second light from a plurality of second light-emitting areas of a second LED array, the second light-emitting areas being separated by second boundaries that correspond in a one-to-one correspondence to the first boundaries;
collimating the second light to form second illumination; and
illuminating the scene with the second illumination, the second light-emitting areas forming corresponding second illumination regions in the second illumination at the scene, each second illumination region at least partially overlapping with a corresponding first illumination region at the scene, the second boundaries forming second dark bands in the second illumination at the scene, the second dark bands being offset from the corresponding first dark bands at the scene.

19. The method of claim 18, further comprising:
receiving, with a controller, a specified illumination pattern;
electrically powering the first LED array in response to the specified illumination pattern such that the first illumination corresponds to the specified illumination pattern; and
electrically powering the second LED array in response to the specified illumination pattern such that the second illumination corresponds to the specified illumination pattern.

20. An illumination system, the system comprising:
a first light-emitting diode (LED) array including a plurality of first light-emitting areas that are configured to emit first light, the first light-emitting areas being separated by first boundaries;
a first lens configured to collimate the first light to form first illumination and illuminate a scene with the first illumination, the first light-emitting areas forming corresponding first illumination regions in the first illumination at the scene, the first boundaries forming first dark bands in the first illumination at the scene, a first central axis extending from the first LED array through a center of the first lens to the scene;
a second LED array including a plurality of second light-emitting areas that are configured to emit second light, the plurality of second light-emitting areas corresponding in a one-to-one correspondence to the plurality of first light-emitting areas, the second light-emitting areas being separated by second boundaries that correspond in a one-to-one correspondence to the first boundaries; and
a second lens configured to collimate the second light to form second illumination and illuminate the scene with the second illumination, a second central axis extending from the second LED array through a center of the second lens to the scene, the second central axis being substantially parallel to the first central axis, the second light-emitting areas forming corresponding second illumination regions in the second illumination at the scene, each second illumination region at least partially overlapping with a corresponding first illumination region at the scene, the second boundaries forming second dark bands in the second illumination at the scene, the second dark bands being substantially parallel to the first dark bands at the scene and offset from the corresponding first dark bands at the scene.

* * * * *